United States Patent
Riess

(10) Patent No.: US 9,078,302 B2
(45) Date of Patent: Jul. 7, 2015

(54) APPARATUS FOR CONTROLLING AN ILLUMINATION DEVICE AND METHOD FOR CONTROLLING AN ILLUMINATION DEVICE

(71) Applicant: Diehl Aerospace GmbH, Ueberlingen (DE)

(72) Inventor: Guenther Riess, Rosstal (DE)

(73) Assignee: DIEHL AEROSPACE GMBH, Überlingen (DE)

( * ) Notice: Subject to any disclaimer, the term of this patent is extended or adjusted under 35 U.S.C. 154(b) by 206 days.

(21) Appl. No.: 13/724,978

(22) Filed: Dec. 21, 2012

(65) Prior Publication Data

US 2013/0162161 A1    Jun. 27, 2013

(30) Foreign Application Priority Data

Dec. 23, 2011    (DE) .......................... 10 2011 122 256

(51) Int. Cl.
*H05B 37/02* (2006.01)
*H05B 39/04* (2006.01)

(52) U.S. Cl.
CPC ............... *H05B 37/02* (2013.01); *H05B 39/047* (2013.01); *Y02B 20/144* (2013.01)

(58) Field of Classification Search
CPC .. H05B 37/02; H05B 39/047; H05B 33/0815; H05B 33/0818; H05B 33/086; Y02B 20/144
USPC ................. 315/307, 308, 291, 294, 312, 360; 362/231, 236, 543, 545, 800
See application file for complete search history.

(56) References Cited

U.S. PATENT DOCUMENTS

| 7,615,939 B2* | 11/2009 | Halter | 315/307 |
| 8,026,677 B2* | 9/2011 | Pohler | 315/312 |
| 8,258,719 B2* | 9/2012 | Hoogzaad | 315/291 |

FOREIGN PATENT DOCUMENTS

| DE | 10 2007 053 481 A1 | 5/2009 |
| DE | 10 2011 004 45 A1 | 8/2011 |

* cited by examiner

*Primary Examiner* — Haiss Philogene
(74) *Attorney, Agent, or Firm* — Scully, Scott, Murphy & Presser, P.C.

(57) ABSTRACT

An apparatus and method for controlling an illumination device in an aircraft is provided. The apparatus has a light source suitable for emitting light with a wavelength in the visible range. The apparatus also has a pulse-width modulator for delivering at least one output signal that is connected to the light source and suitable for effecting brightness control of the light source. The output signal is composed from a first number of first subsignals each having a first pulse width and a second number of second subsignals each having a second pulse width shorter than the first pulse width. The brightness of the light source is adjustable by varying the first number and the second number for a brightness change and the output signal is repeated after delivery of the first number and second number of subsignals.

15 Claims, 2 Drawing Sheets

APPARATUS FOR CONTROLLING AN ILLUMINATION DEVICE AND METHOD FOR CONTROLLING AN ILLUMINATION DEVICE

FIELD OF THE INVENTION

The invention relates to an apparatus for controlling an illumination device, particularly in an aircraft, and to a method for controlling an illumination device, particularly in an aircraft.

BACKGROUND OF THE INVENTION

The lighting of a modern aircraft cabin is nowadays subject to very great demands. For the coloured configuration of the cabin, attention should be paid in particular to exact colour locus reproduction and brightness compliance. Likewise, the often desired adjustability of the brightness in a range of from 0.1% to 100% places great requirements on the controlling of illumination devices. This applies in particular when carrying out a gamut colour locus correction, which is indispensable for colour locus adjustment or for manufacturing adjustment. To this end, the individual colours would need to be controllable with a brightness which is significantly less than 0.1%. The effect of this, in particular, is that lighting means without, or with reduced or insufficient gamut correction, operate at low brightnesses and a satisfactory gamut correction is only achieved with higher brightness.

It is expected that the requirements relating to the colour locus at low brightness are constantly increasing. For many types of aircraft, for example, a maximum colour difference of less than 6 threshold value units of a MacAdam ellipse is required as far as interior illumination is concerned, the colour difference also being necessary in a brightness range of from 0.1 to 1%.

The brightness control of cabin illumination is conventionally carried out by means of so-called pulse-width modulators. The minimum duty cycle of a pulse-width modulator is generally determined by the switching behaviour of the current source, and is conventionally established at about 1 µs. Contemporary pulse-width modulators are driven by means of a microcontroller, the shortest clock period of which may for example be 50 ns. For a minimum duty cycle of 1 µs of the pulse-width modulator, this gives merely 20 clock periods for the microcontroller. If the pulse-width modulator is then increased by just one clock period, the duty cycle changes by 5%. Consequently, for low obscuration levels (dimming levels) the colour locus cannot be adjusted exactly, or the brightness can only be adjusted in stages.

A possible improvement of the brightness control could consist in providing a further current source in order to avoid the restriction of the minimum duty cycle by the switching behaviour of the current source. Although the minimum change in the brightness control could thereby be about halved, the installation of a further current source would however be expensive.

SUMMARY OF THE INVENTION

It is therefore an object of the invention to provide an apparatus for controlling an illumination device, and a method for controlling an illumination device, which overcome the disadvantages mentioned in the introduction and in particular allow exact adjustment of the colour locus, or brightness, at low obscuration levels.

This object can be achieved by an exemplary aspect or embodiment of the invention and further advantageous configurations of the exemplary aspect or embodiment. They may be combined with one another in a technologically expedient way. The description, particularly in conjunction with the drawing, additionally characterizes and specifies the invention.

The apparatus according to the invention for controlling an illumination device comprises a light source which is suitable for emitting light having a wavelength in the visible range. A pulse-width modulator is furthermore provided, which delivers at least one output signal that is connected to the light source and is suitable for effecting brightness control of the light source. The output signal is composed from a first number of first subsignals each having a first pulse width and a second number of second subsignals each having a second pulse width, which is shorter than the first pulse width, so that the brightness of the light source can be adjusted. The first number and the second number can in this case be varied for a brightness change. The output signal is repeated after delivery of the first number and second number of subsignals.

According to the invention, the resolution conventionally achievable with a pulse-width modulator is improved in that the output signal no longer consists of just one signal but is composed from the first number and the second number of subsignals. Accordingly, for example for a desired brightness change, the first number may be increased or reduced by one while the second number may be reduced or increased correspondingly. By the periodic delivery of the first number and the second number of subsignals, on average an output signal is achieved which has a resolution proportional to the total number of the first number plus the second number. Thus, for example, with a total number of ten subsignals, a brightness change of 0.5% can be achieved as an average.

According to one configuration of the invention, the apparatus comprises further light sources that are connected to the pulse-width modulator and can respectively be controlled in terms of their brightness by means of further output signals, the brightness control of all the light sources producing a gamut correction. In order to comply with desired requirements relating to the colour locus at low brightness, the brightness must be adjustable accurately. According to the invention, this is possible since the output signal generated has an improved resolution for the brightness adjustment, so that accurate adjustment of the colour locus can take place in particular at low brightness.

In another configuration, the apparatus comprises at least three light sources that are suitable for respectively emitting light with a different wavelength, preferably in an RGB colour space.

The colour impression prevailing for example in an aircraft cabin is often predetermined by the manufacturers. In order to be able to generate different colours, the desired colour impression is generated by the superimposition of at least three light sources.

In another configuration, the output signal can be generated by means of a microprocessor.

Interior illuminations are often driven, particularly in aircraft, by using a microprocessor, which conventionally comprises an output that by suitable programming can function as a pulse-width modulator. Consequently, the invention can be used in already existing interior illuminations without having to carry out modifications to the construction. Since it is merely necessary to alter the programming, an economical embodiment is made possible which can be used particularly in many types of aircraft.

In another configuration, the first pulse width is longer than the second pulse width by one clock period of the pulse-width modulator.

Accordingly, the achievable brightness change corresponds to the minimum time resolution of the pulse-width modulator.

It is provided that the clock period of the pulse-width modulator is between 5 ns and 5 µs, preferably between 20 ns and 100 ns, and in particular 50 ns.

Pulse-width modulators are often produced by means of a microprocessor, the clock rate of which conventionally lies in the MHz range. According to this embodiment, the clock period is selected in accordance with the conventional clock rate.

Furthermore the first and second numbers together give a total number which is between 2 and 20, preferably between 5 and 15, and in particular 10.

The achievable resolution improvement is determined by establishing the total number of the first number plus the second number. As an example, the clock frequency may be 20 MHz, in which case, as mentioned in the introduction, then the minimum duty cycle in the pulse-width modulator is determined by the switching behaviour of the current source and is conventionally established at about 1 µs. If a total of 10 subsignals are then provided, the minimum resolution is 0.5% according to the invention. The minimum resolution can be correspondingly established through the selection of the total number.

The method according to the invention for controlling an illumination device comprises provision of a light source which is suitable for emitting electromagnetic radiation having a wavelength in the visible range. A pulse-width modulator is also provided, which delivers an output signal that is connected to the light source and is suitable for effecting brightness control of the light source. The output signal is composed from a first number of first subsignals each having a first pulse width and a second number of second subsignals each having a second pulse width, which is shorter than the first pulse width. In this way, the brightness of the light source can be adjusted by increasing the first number by at least one for a brightness increase and correspondingly reducing the second number, and for a brightness reduction reducing it by at least one and correspondingly increasing the second number. The output signal is delivered periodically.

The first subsignal and the second subsignals may be selected in such a way that the brightness of the light source can be regulated in a range of up to 100%.

In another configuration, further light sources and further output signals are provided, a brightness control respectively being carried out in order to produce a gamut correction.

In another configuration, the first subsignal and the group of second subsignals are selected in such a way that the colour difference of the light source in the range of from 0.1% to 1% is less than 10, preferably less than 6, threshold value units of a MacAdam ellipse.

The colour difference is usually described as the threshold value unit of the MacAdam ellipse, although other procedures are not meant to be excluded. The numerical examples correspond to the specifications which are provided by aircraft manufacturers.

An illumination device is provided, which comprises an apparatus according to the invention as described above.

An aircraft is furthermore provided which, particularly in a cabin, comprises at least one illumination device that is connected to an apparatus according to the invention as described above.

Lastly, a medium readable by a computer is provided, which comprises instructions that allow a computer, preferably a microcontroller, to carry out a method as described above.

BRIEF DESCRIPTION OF THE DRAWINGS

Some exemplary embodiments will be explained in more detail below with the aid of the drawings, in which.

DETAILED DESCRIPTION OF EXEMPLARY EMBODIMENTS

In the figures, components which are the same or have a functionally equivalent effect are provided with the same references.

Figure 1:
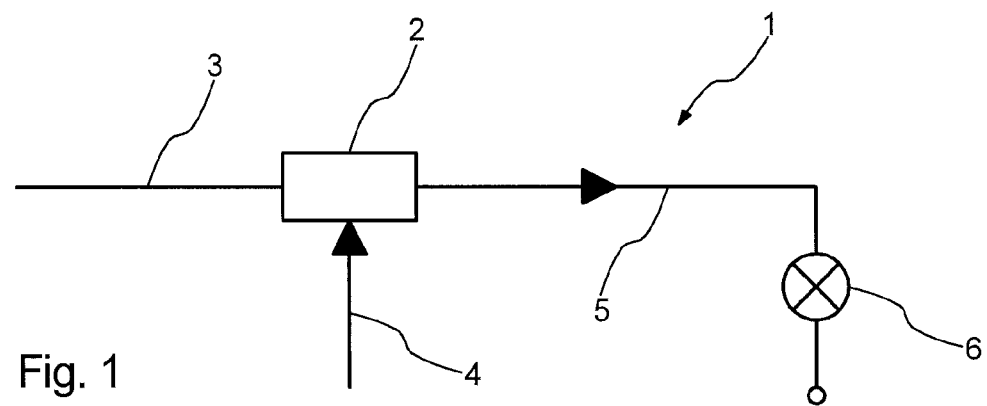
FIG. 1 shows a schematic representation of an illumination device according to the invention.

An embodiment of the invention will be explained in more detail below with reference to FIG. 1. FIG. 1 shows an apparatus 1 for controlling an illumination device which may be used particularly in an aircraft. The apparatus comprises a pulse-width modulator 2, which is provided for example as a timer circuit of a microcontroller (not shown in FIG. 1). The pulse-width modulator 2 is operated by using a clock signal 3, which may for example be 20 MHz. The pulse-width modulator 2 is furthermore provided with a data input 4, by means of which a pulse width at an output 5 can be adjusted. The data input 4 may, for example, comprise a 16-bit data word. The output 5 is connected to a light source 6.

It is to be understood that the numerical values mentioned by way of example merely serve for illustration. Thus, within sensible limits, the person skilled in the art is readily capable of carrying out corresponding modifications and selecting other values.

Figure 2:
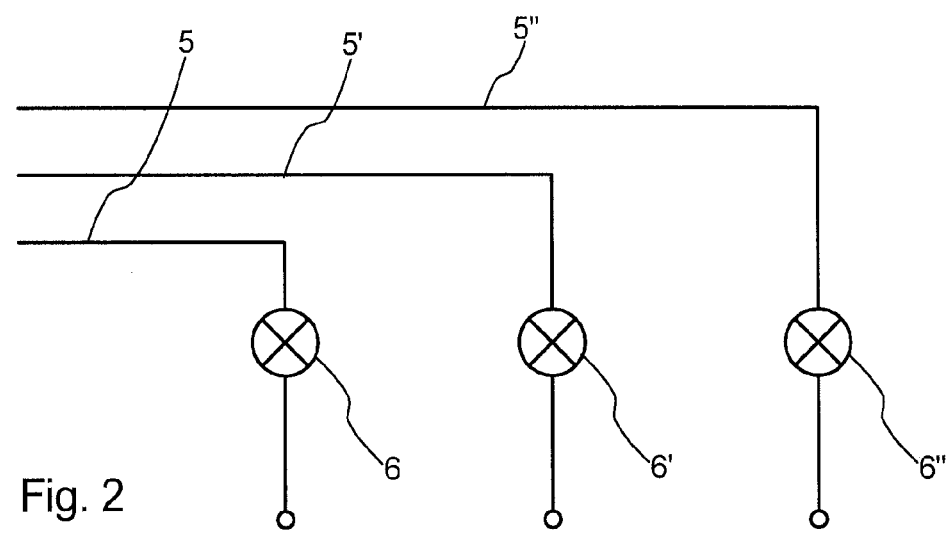
FIG. 2 shows a further schematic representation of an illumination device according to the invention.

As represented in FIG. 2, at least three light sources 6, 6' and 6" may be provided, each of which emits light with a different wavelength, so as to form an RGB colour space in which a desired colour impression can be adjusted accurately. It is naturally possible to use another colour space or a different number of light sources 6.

As will be explained below, the output signal is composed of a first number of first subsignals each having a first pulse width and a second number of second subsignals each having a second pulse width, which is shorter than the first pulse width.

Figure 3:
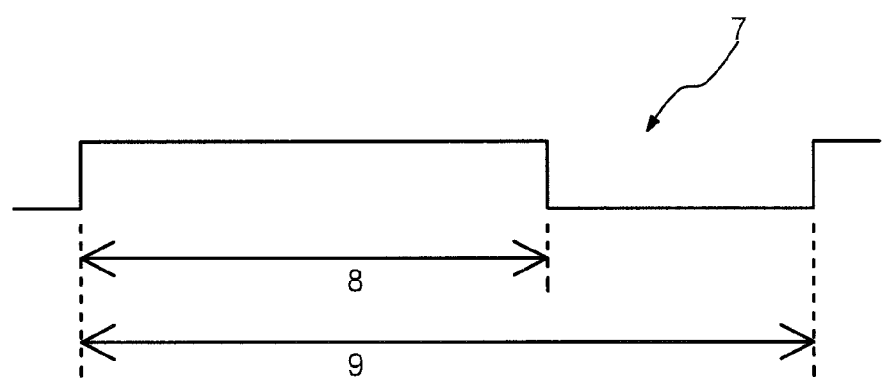
FIG. 3 shows a schematic representation of subsignals according to the invention.

An example of a first subsignal is shown in FIG. 3. The subsignal 7 has a pulse width 8 which can be varied by means of suitable programming of the pulse-width modulator 2. In this case, it should be borne in mind that the minimum duty cycle of the pulse-width modulator 6 is generally determined by the switching behaviour of a current source provided for driving the light source, and is conventionally established at about 1 µs. A subsignal having a duty cycle of 70% is shown in FIG. 3. The repetition rate of the subsignal 7 is likewise indicated as a total duration 9 in FIG. 3.

Figure 4:
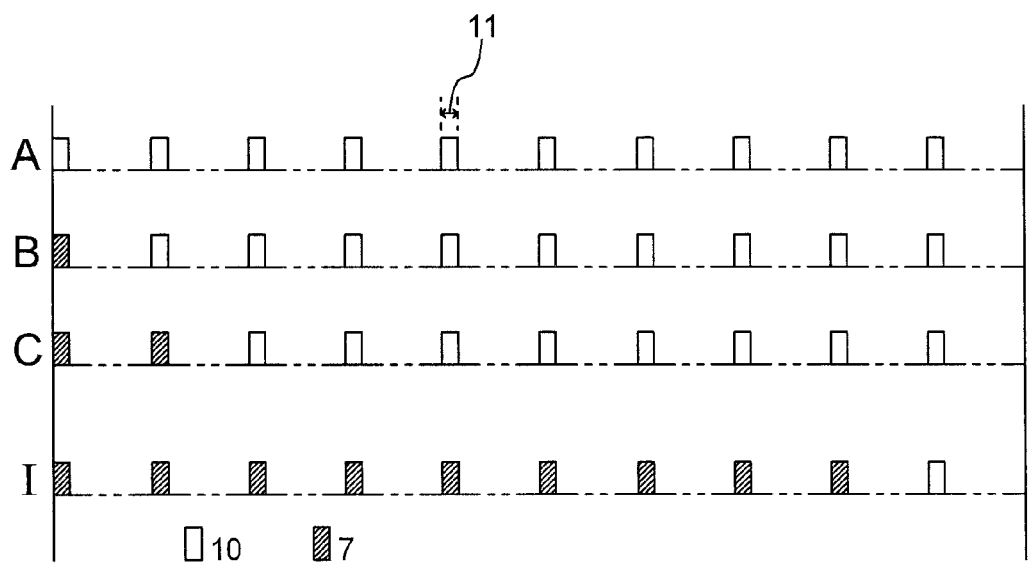
FIG. 4 shows a sequence of subsignals according to the invention.

The brightness of the light source 6 is adjustable by varying a first number of first subsignals 7 and a second number of second subsignals for a brightness change. This will be explained in more detail with reference to FIG. 4. FIG. 4 shows a sequence of the first subsignals 7 and second subsignals 10. The pulse width 8 of the first subsignal 7 is in this case longer than the pulse width 11 of the second subsignal 10 by one clock period. In the case of sequence "B", the first subsignal 7 is delivered once and the second subsignal 10 is delivered nine times. The output signal is repeated after delivery of the first number and the second number of subsignals 7 and 10. If a slight increase in the brightness of the light source 6 is then desired, sequence "C" may be switched to. There, the first subsignal 7 is delivered twice and the second subsignal 10 is delivered eight times. Consequently, the total power transferred to the light source 6 is longer by one clock step. Averaged over the entire period of sequence "C", a resolution of the brightness control of the light source 6 improved by ten times is obtained.

In order to correspondingly reduce the intensity of the brightness of the light source 6, it would be possible to change from sequence "B" to sequence "A". In the case of sequence "A", the first subsignal 7 is not delivered at all and the second subsignal 10 is delivered ten times. The further sequences are obtained by successive insertion of further first subsignals 7, i.e. by increasing the first number, as shown in FIG. 4 with the aid of the sequence "I". These sequences of the subsignals 7 with the first number and subsignals 10 with the second number may be stored in a memory of the microcontroller.

The gain in resolution achievable for the brightness control of the light source 6 will be further illustrated with the aid of the following numerical examples.

With a minimum pulse width for the subsignals of 1 μs, the shortest pulse width 11 of the second subsignal 10 is twenty clock sequences for a period duration of 50 ns of the clock signal 3. The first subsignal 7, which is longer by one clock period, consequently has a pulse width 8 which corresponds at least to twenty-one clock sequences. When changing from sequence "A" to "B" according to FIG. 4, a resolution of 0.5% is consequently achieved since the power provided to the light source is increased from 200 clock sequences to 201 clock sequences. Averaged over ten subsignals, an average value of 20.1 clock sequences is obtained.

Figure 5:
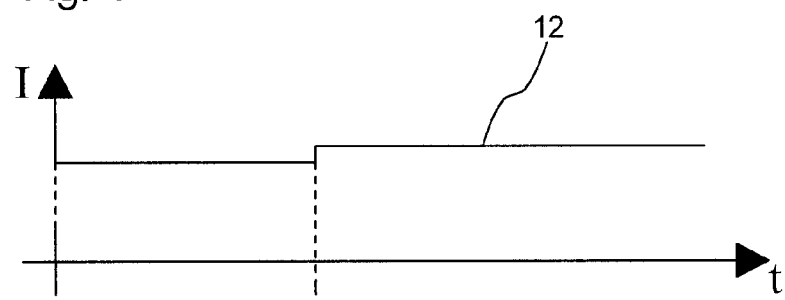
FIG. 5 shows a schematic representation of a brightness change according to the invention.

This is schematically represented once more in FIG. 5. A profile 12 of the brightness I of the light source 6 as a function of time is represented in FIG. 5 during the switchover. The brightness change ΔI may, as described above, be adjusted with a resolution of 0.5%.

This may be used particularly in order to produce a gamut correction. To this end, the light sources 6, 6' and 6" are connected to a corresponding output 5, 5' and 5" of the pulse-width modulator 2 and respectively controlled in terms of their brightness. The first subsignal and the second subsignal are selected in terms of their number in such a way that the colour difference of the light sources 6, 6' and 6" in the range of from 0.1% to 1% is less than 10, for example 6, threshold value units of a MacAdam ellipse. The brightness may in this case be controllable up to 100%.

Figure 6:
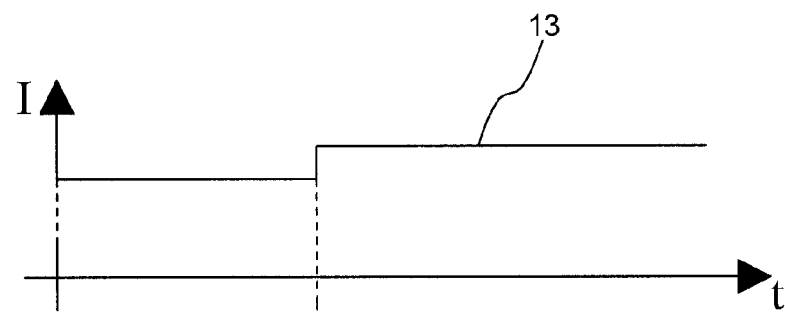
FIG. 6 shows a schematic representation of a brightness change in a comparative example.

In comparison with this, FIG. 6 represents a profile 13 of the brightness I of the light source 6 as a function of time during the switchover according to a comparative example. A minimum duty cycle of 1 μs of the pulse-width modulator gives 20 clock periods. If the pulse-width modulator is then increased by one clock period, the duty cycle changes by 5%.

In a method for controlling an illumination device, particularly in an aircraft, the following steps are carried out. After provision of the light source 6 and the pulse-width modulator 2, which delivers the output signal 5 that is connected to the light source 6 and is suitable for effecting brightness control of the light source 6, the output signal is composed. In this case, the brightness of the light source is adjusted from a first number of first subsignals 7 each having a first pulse width 8 and a second number of second subsignals 10 each having a second pulse width 11, which is shorter than the first pulse width 7. This is done by increasing the first number by at least one for a brightness increase and correspondingly reducing the second number, and for a brightness reduction reducing it by at least one and correspondingly increasing the second number. The output signal 6 is delivered periodically.

A medium readable by a computer may comprise instructions which allow a microcontroller to carry out the method above.

The apparatus 1 according to the invention may be used in a cabin of an aircraft together with an illumination device.

LIST OF REFERENCES 1 apparatus
2 pulse-width modulator
3 clock signal
4 data input
5 output signal
6 light source
6' further light source
6" further light source
7 first subsignal
8 first pulse width
9 pulse duration
10 second subsignal
11 second pulse width
12 brightness profile
13 conventional brightness profile

The invention claimed is:

1. An apparatus for controlling an illumination device, comprising:
a light source, which is suitable for emitting light having a wavelength in the visible range, and
a pulse-width modulator, which delivers at least one output signal that is connected to the light source and is suitable for effecting brightness control of the light source,
wherein the output signal is composed from a first number of first subsignals each having a first pulse width and a second number of second subsignals each having a second pulse width, the second pulse width being shorter than the first pulse width, so that the brightness of the light source is adjusted by varying the first number and the second number for a brightness change and the output signal is repeated after delivery of the first number and second number of subsignals.

2. The apparatus according to claim 1, further comprising light sources that are connected to the pulse-width modulator and are respectively controlled in terms of the brightness of the light sources by means of further output signals, wherein the brightness control of all the light sources produces a gamut correction.

3. The apparatus according to claim 2, which comprises at least three light sources that are suitable for respectively emitting light with a different wavelength.

4. The apparatus according to claim 1, wherein the output signal is generated by means of a microcontroller.

5. The apparatus according to claim 1, wherein the first pulse width is longer than the second pulse width by one clock period of the pulse-width modulator.

6. The apparatus according to claim 5, wherein the clock period of the pulse-width modulator is between 5 ns and 5 μs.

7. The apparatus according to claim 1, wherein the first and second numbers collectively provide a total number which is between 2 and 20.

8. An illumination device, comprising the apparatus according to claim 1.

9. An aircraft comprising at least one illumination device that is connected to an apparatus according to claim 1.

10. The apparatus according to claim 1, wherein said illumination device is in an aircraft.

11. The apparatus according to claim 3, wherein said different wavelength is an RGB color space.

12. The apparatus according to claim 5, wherein the clock period of the pulse width modulator is between 20 ns and 100 ns.

13. The apparatus according to claim 5, wherein the clock period of the pulse width modulator is 50 ns.

14. The apparatus according to claim 1, wherein the first and second numbers collectively provide a total number which is between 5 and 15.

15. The apparatus according to claim 1, wherein the first and second numbers collectively provide a total number of 10.

* * * * *